US008223205B2

(12) United States Patent
Frenkel et al.

(10) Patent No.: US 8,223,205 B2
(45) Date of Patent: Jul. 17, 2012

(54) SECURE IMPLEMENTATION OF NETWORK-BASED SENSORS

(75) Inventors: Lior Frenkel, Rehovit (IL); Amir Zilberstein, Yad Rambam (IL)

(73) Assignee: Waterfall Solutions Ltd., Rosh Ha'Ayin (IL)

( * ) Notice: Subject to any disclaimer, the term of this patent is extended or adjusted under 35 U.S.C. 154(b) by 1203 days.

(21) Appl. No.: 11/977,391

(22) Filed: Oct. 24, 2007

(65) Prior Publication Data

US 2009/0113500 A1 Apr. 30, 2009

(51) Int. Cl.
*H04N 7/18* (2006.01)
(52) U.S. Cl. .................................... 348/150; 709/231
(58) Field of Classification Search .............. 348/143, 348/150–160
See application file for complete search history.

(56) References Cited

U.S. PATENT DOCUMENTS

| | | | |
|---|---|---|---|
| 4,985,919 A | 1/1991 | Naruse et al. |
| 4,987,595 A | 1/1991 | Marino, Jr. et al. |
| 5,530,758 A | 6/1996 | Marino, Jr. et al. |
| 5,548,646 A | 8/1996 | Aziz et al. |
| 5,677,952 A | 10/1997 | Blakley et al. |
| 5,732,278 A | 3/1998 | Furber et al. |
| 5,835,726 A | 11/1998 | Shwed et al. |
| 5,940,507 A | 8/1999 | Cane et al. |
| 5,946,399 A | 8/1999 | Kitaj et al. |
| 5,995,628 A | 11/1999 | Kitaj et al. |
| 6,023,570 A | 2/2000 | Tang et al. |
| 6,049,611 A | 4/2000 | Tatebayashi et al. |
| 6,240,514 B1 | 5/2001 | Inoue et al. |
| 6,289,377 B1 | 9/2001 | Lalwaney et al. |
| 6,317,831 B1* | 11/2001 | King ............................ 713/171 |
| 6,470,449 B1 | 10/2002 | Blandford |
| 6,574,640 B1 | 6/2003 | Stahl |
| 6,601,126 B1 | 7/2003 | Zaidi et al. |
| 6,615,244 B1 | 9/2003 | Singhal |
| 6,643,701 B1 | 11/2003 | Aziz et al. |
| 6,738,388 B1 | 5/2004 | Stevenson et al. |
| 6,915,435 B1 | 7/2005 | Merriam |
| 6,931,549 B1 | 8/2005 | Ananda |
| 6,957,330 B1 | 10/2005 | Hughes |
| 6,963,817 B2 | 11/2005 | Ito et al. |
| 6,966,001 B2 | 11/2005 | Obara et al. |
| 6,970,183 B1 | 11/2005 | Monroe |

(Continued)

FOREIGN PATENT DOCUMENTS

EP 1632833 A2 3/2006

(Continued)

OTHER PUBLICATIONS

Innominate Security Technologies, "Press Release: Innominate joins Industrial Defender Enabled Partner Program", Germany, Apr. 14, 2008 http://www.innominate.com/content/view/288/120/lang,en/.

(Continued)

*Primary Examiner* — Ajay Bhatia
(74) *Attorney, Agent, or Firm* — Husch Blackwell LLP

(57) ABSTRACT

Sensing apparatus includes a network camera, which is configured to capture images of a scene and to output a sequence of data packets containing digitized video data responsively to the images. A one-way link is coupled to the network camera so as to transmit the data packets from the network camera to a packet communication network.

16 Claims, 3 Drawing Sheets

U.S. PATENT DOCUMENTS

| | | | |
|---|---|---|---|
| 6,986,061 B1 | 1/2006 | Kunzinger | |
| 7,031,322 B1 | 4/2006 | Matsuo | |
| 7,062,587 B2 | 6/2006 | Zaidi et al. | |
| 7,171,566 B2 | 1/2007 | Durrant | |
| 7,200,693 B2 | 4/2007 | Jeddeloh | |
| 7,254,663 B2 | 8/2007 | Bartley et al. | |
| 7,260,833 B1 | 8/2007 | Schaeffer | |
| 7,324,515 B1 | 1/2008 | Chapman | |
| 7,366,894 B1 | 4/2008 | Kallimuthu et al. | |
| 7,660,959 B2 | 2/2010 | Asher et al. | |
| 7,675,867 B1 | 3/2010 | Mraz et al. | |
| 7,698,470 B2 | 4/2010 | Ruckerbauer et al. | |
| 7,716,467 B1 | 5/2010 | Deffet et al. | |
| 7,761,704 B2 | 7/2010 | Ho et al. | |
| 7,814,316 B1 | 10/2010 | Hughes et al. | |
| 7,815,548 B2 | 10/2010 | Barre et al. | |
| 7,845,011 B2 | 11/2010 | Hirai | |
| 7,849,330 B2 | 12/2010 | Osaki | |
| 8,041,832 B2 | 10/2011 | Hughes et al. | |
| 8,046,443 B2* | 10/2011 | Parker et al. | 709/220 |
| 2001/0033332 A1* | 10/2001 | Kato et al. | 348/211 |
| 2002/0065775 A1 | 5/2002 | Monaghan | |
| 2002/0191866 A1* | 12/2002 | Tanabe | 382/298 |
| 2002/0199181 A1* | 12/2002 | Allen | 725/1 |
| 2003/0037247 A1 | 2/2003 | Obara et al. | |
| 2003/0061505 A1 | 3/2003 | Sperry et al. | |
| 2003/0114204 A1* | 6/2003 | Allen et al. | 455/574 |
| 2003/0140239 A1 | 7/2003 | Kuroiwa et al. | |
| 2003/0159029 A1 | 8/2003 | Brown et al. | |
| 2003/0217262 A1 | 11/2003 | Kawai et al. | |
| 2004/0022107 A1 | 2/2004 | Zaidi et al. | |
| 2004/0070620 A1* | 4/2004 | Fujisawa | 345/764 |
| 2004/0071311 A1* | 4/2004 | Choi et al. | 382/100 |
| 2004/0080615 A1* | 4/2004 | Klein et al. | 348/143 |
| 2004/0175123 A1* | 9/2004 | Lim et al. | 386/95 |
| 2004/0217890 A1* | 11/2004 | Woodward et al. | 341/143 |
| 2004/0247308 A1* | 12/2004 | Kawade | 396/310 |
| 2005/0015624 A1 | 1/2005 | Ginter et al. | |
| 2005/0033990 A1* | 2/2005 | Harvey et al. | 713/201 |
| 2005/0085964 A1* | 4/2005 | Knapp et al. | 701/33 |
| 2005/0119967 A1 | 6/2005 | Ishiguro et al. | |
| 2005/0138369 A1 | 6/2005 | Lebovitz et al. | |
| 2005/0264415 A1* | 12/2005 | Katz | 340/538 |
| 2006/0047887 A1 | 3/2006 | Jeddeloh | |
| 2006/0064550 A1 | 3/2006 | Katsuragi et al. | |
| 2006/0085354 A1 | 4/2006 | Hirai | |
| 2006/0085534 A1* | 4/2006 | Ralston et al. | 709/223 |
| 2006/0095629 A1 | 5/2006 | Gower et al. | |
| 2006/0136724 A1 | 6/2006 | Takeshima et al. | |
| 2006/0179208 A1 | 8/2006 | Jeddeloh | |
| 2006/0220903 A1 | 10/2006 | Zigdon et al. | |
| 2006/0248582 A1 | 11/2006 | Panjwani et al. | |
| 2006/0259431 A1 | 11/2006 | Poisner | |
| 2006/0271617 A1 | 11/2006 | Hughes et al. | |
| 2007/0028027 A1 | 2/2007 | Janzen et al. | |
| 2007/0028134 A1 | 2/2007 | Gammel et al. | |
| 2007/0043769 A1 | 2/2007 | Kasahara et al. | |
| 2007/0055814 A1 | 3/2007 | Jeddeloh | |
| 2007/0063866 A1 | 3/2007 | Webb | |
| 2007/0112863 A1 | 5/2007 | Niwata et al. | |
| 2007/0203970 A1 | 8/2007 | Nguyen | |
| 2007/0283297 A1 | 12/2007 | Hein et al. | |
| 2008/0066192 A1 | 3/2008 | Greco et al. | |
| 2008/0082835 A1 | 4/2008 | Asher et al. | |
| 2008/0155273 A1 | 6/2008 | Conti | |
| 2009/0002150 A1 | 1/2009 | Zilberstein et al. | |
| 2009/0019325 A1 | 1/2009 | Miyamoto et al. | |
| 2011/0213990 A1 | 9/2011 | Poisner | |

FOREIGN PATENT DOCUMENTS

| | | |
|---|---|---|
| GB | 2371125 A | 7/2002 |
| WO | 01/63879 A1 | 8/2001 |
| WO | PCT/IL2006/001499 | 12/2006 |
| WO | 2008001344 A2 | 1/2008 |
| WO | WO 2008/001344 | 1/2008 |
| WO | 2008026212 A2 | 3/2008 |
| WO | 2008087640 A2 | 7/2008 |
| WO | 2009004611 A2 | 1/2009 |
| WO | 2009053990 A2 | 4/2009 |

OTHER PUBLICATIONS

Waterfall Security Solutions Ltd., "Waterfall One Way Link Technology", 2008 http://www.waterfall-solutions.com/home/Waterfall_Technology.aspx.

Multi-State Information Sharing Analysis Center (MSISAC), "Cyber Security Procurement Language for Control Systems", version 1.8, revision 3, Feb. 2008 http://www.msisac.org/scada/documents/4march08scadaprocure.pdf.

International Application PCT/IL2008/000886 Search Report dated Nov. 13, 2008.

International Application PCT/IL2008/000070 Search Report dated Jun. 16, 2008.

International Application PCT/IL2007/001070 Search Report dated Jul. 25, 2008.

Axis Communications., "Axis Network Cameras", 2008 http://www.axis.com/products/video/camera/index.htm.

International Application PCT/IL2006/001499 Search Report dated Apr. 8, 2008.

International Application PCT/IL2006/001499 Patentability Report dated Mar. 19, 2009.

International Application PCT/IL2007/001070 Patentability Report dated Mar. 16, 2009.

International Application PCT/IL2008/001513 Search Report dated Mar. 10, 2009.

Check Point Software Technologies Ltd., "Extended Unified Threat Management capabilities with new multi-layer messaging security deliver best all-inclusive security solution", USA, Nov. 18, 2008 http://www.checkpoint.com/press/2008/utm-1-edge-upgrade-111808.html.

Zilberstein et al., U.S. Appl. No. 11/823,950—Official Action dated Jun. 22, 2009.

IL Patent Application # 177,756 Official Action dated Aug. 17, 2010.
IL Patent Application # 180,748 Official Action dated Oct. 25, 2010.
Dudi Einav, "Waterfall IP Surveillance Enabler", Jul. 2007.
U.S. Appl. No. 12/447,470 Official Action dated Mar. 25, 2011.
Israel Patent Application # 201473 Official Action dated May 8, 2011.
Frenkel, L., "Unidirectional Information Transfer", Web issue, Jun. 2005.
U.S. Appl. No. 12/447,470 Official Action dated Sep. 14, 2011.
U.S. Appl. No. 12/306,692 Official Action dated Sep. 28, 2011.
U.S. Appl. No. 12/447,470 Official Action dated Feb. 9, 2012.
U.S. Appl. No. 12/438,548 Official Action dated Mar. 6, 2012.
U.S. Appl. No. 12/306,692 Official Action dated Feb. 13, 2012.
European Patent Application # 07805530.8 Search report dated Mar. 6, 2012.
European Patent Application # 08702651.4 Search Report dated May 11, 2012.

* cited by examiner

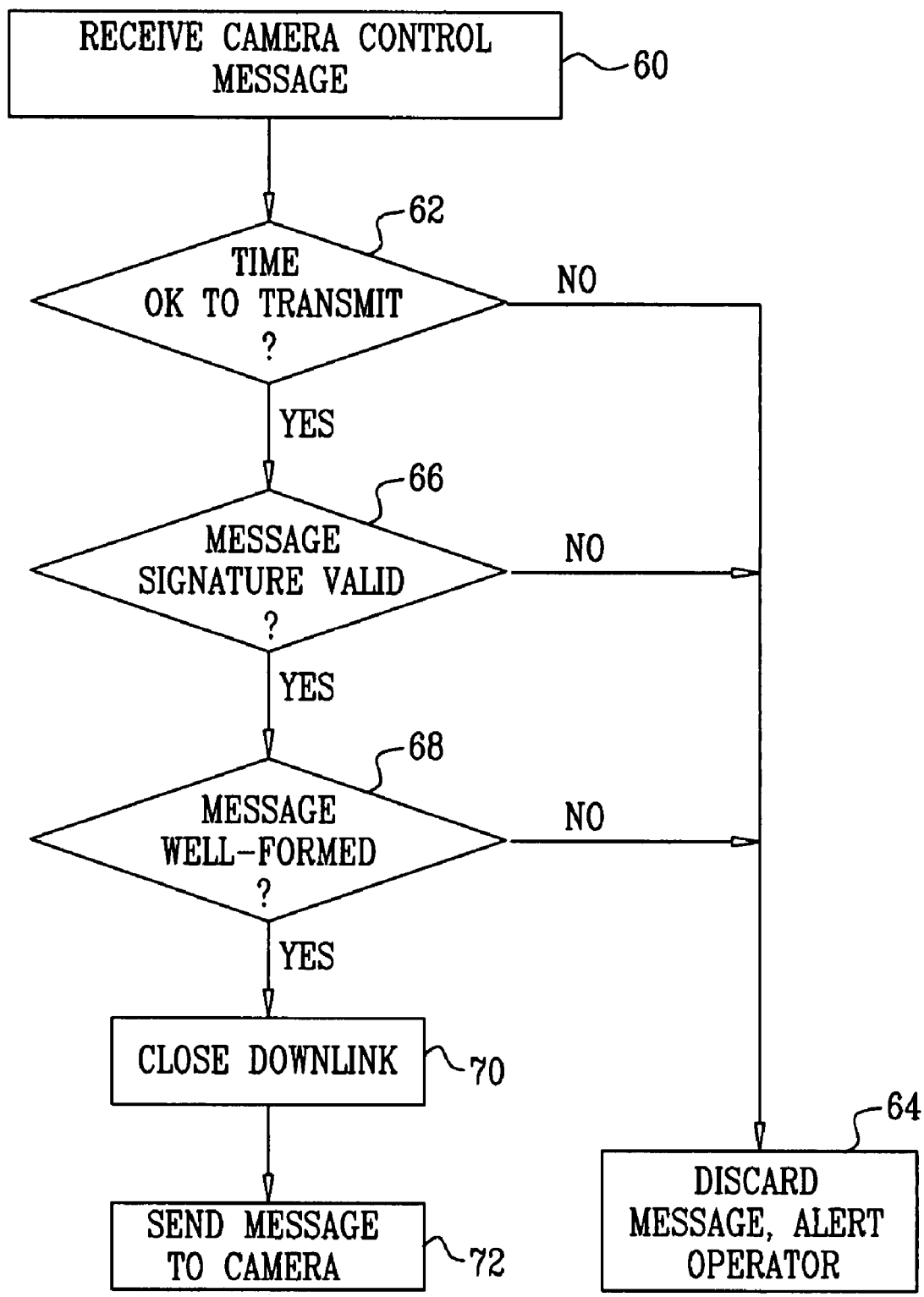

SECURE IMPLEMENTATION OF NETWORK-BASED SENSORS

FIELD OF THE INVENTION

The present invention relates generally to computerized monitoring systems, and specifically to prevention of unauthorized access to such systems.

BACKGROUND OF THE INVENTION

Network cameras (also known as IP cameras) are becoming increasingly popular in surveillance applications. The term "network camera" is used in the context of the present patent application and in the claims to refer to a self-contained video device that outputs a sequence of data packets containing digitized image data. Such cameras contain not only a video sensor and associated video electronics, but also digital processing circuitry and a packet network interface with the necessary hardware and software to plug in directly to a packet communication network, such as an Ethernet local area network (LAN). Network cameras are particularly convenient for security applications, because they can be deployed freely in and around a facility using the existing LAN infrastructure, rather than requiring dedicated cabling to be run to each camera as in traditional video security systems.

A growing number of manufacturers supply network cameras. Axis Communications (Lund, Sweden), for example, sells a line of network cameras that may be used in embodiments of the present invention that are described hereinbelow.

In a computer network handling sensitive data, such as data in military or financial environments, portions of the network may be connected by one-way links. The term "one-way link" is used in the context of the present patent application and in the claims to refer to a communication link that is physically configured to carry signals in one direction and to be incapable of carrying signals in the opposite direction. For example, confidential data that must not be accessed from external sites may be stored on a computer that is configured to receive data over a one-way link and has no physical outgoing link over which data might be transmitted to the external site.

One-way links may be implemented, for example, using Waterfall™ systems, which are manufactured by Gita Technologies, Ltd. (Rosh HaAyin, Israel). The Waterfall system provides a physical one-way connection based on fiberoptic communication, using an underlying proprietary transfer protocol. When a transmitting computer is connected by a Waterfall system (or other one-way link) to a receiving computer, the receiving computer can receive data from the transmitting computer but has no physical means of sending any return communications to the transmitting computer.

SUMMARY OF THE INVENTION

Despite the convenience of network cameras (and other sorts of network sensors) for security applications, deployment of such cameras on a LAN creates a new security risk: Malicious parties may attempt to gain access to the LAN via the point of connection of the camera to the LAN. This risk is particularly acute when cameras are deployed on the outside of a secured facility, such as on the outer wall of a building or a perimeter fence, or in sparsely attended locations within the premises, such as washrooms, corridors and basements.

Embodiments of the present invention that are described hereinbelow use one-way links in order to mitigate this risk. By connecting a network camera to the network only via a one-way link, for example, the opportunity for a malicious party to access resources on the network via the point of connection of the camera is curtailed or eliminated entirely. This use of a one-way link thus protects both the surveillance network and components on the surveillance network, including other cameras, as well as protecting any other networks that are linked to the surveillance network. In some embodiments, when it is necessary to convey commands to the camera, a separate one-way link may be provided for this purpose.

Although the embodiments described herein refer mainly to network cameras, the principles of the present invention may be used in preventing malicious access via substantially any sort of network-enabled sensor.

There is therefore provided, in accordance with an embodiment of the present invention, sensing apparatus, including:

a network camera, which is configured to capture images of a scene and to output a sequence of data packets containing digitized video data responsively to the images; and a one-way link, which is coupled to the network camera so as to transmit the data packets from the network camera to a packet communication network.

In a disclosed embodiment, the network camera is deployed outside a facility, and the packet communication network is a local area network (LAN) that is deployed inside the facility.

In some embodiments, the one-way link includes a first one-way link, and the apparatus includes a second one-way link coupled to convey commands to the network camera. The apparatus may include a switch, which is configured to be actuated in response to a predetermined condition for transmission of the commands to the network camera and to prevent transmission over the second one-way link when the predetermined condition is not satisfied. In one embodiment, the switch is configured to permit the transmission of a message to the network camera only at one or more specified times of day. Alternatively or additionally, the switch is configured to permit the transmission of a message to the network camera only upon ascertaining that the message is valid. Further alternatively or additionally, the switch is configured to permit the transmission of a message to the network camera only when the first one-way link is inactive.

In another embodiment, the one-way link includes a controller, which is coupled to submit instructions to the network camera on a predetermined schedule and to receive and convey the data packets from the network camera over the one-way link to the packet communication network.

There is also provided, in accordance with an embodiment of the present invention, sensing apparatus, including:

a network sensor, which is configured to sense a characteristic of an environment outside a facility and to output a sequence of data packets containing digitized sensor data responsively to the sensed characteristic; and a one-way link, which is coupled to the network sensor so as to transmit the data packets from the network sensor to a packet communication network inside the facility.

The network sensor may include a network camera.

There is additionally provided, in accordance with an embodiment of the present invention, a method for sensing, including:

deploying a network sensor to sense a characteristic of an environment outside a facility and to output a sequence of data packets containing digitized sensor data responsively to the sensed characteristic; and coupling a one-way link to the network sensor so as to transmit the data packets from the network sensor to a packet communication network inside the facility.

The present invention will be more fully understood from the following detailed description of the embodiments thereof, taken together with the drawings in which:

BRIEF DESCRIPTION OF THE DRAWINGS

FIG. 3 is a flow chart that schematically illustrates a method for controlling a network camera, in accordance with an embodiment of the present invention.

DETAILED DESCRIPTION OF EMBODIMENTS

Figure 1:
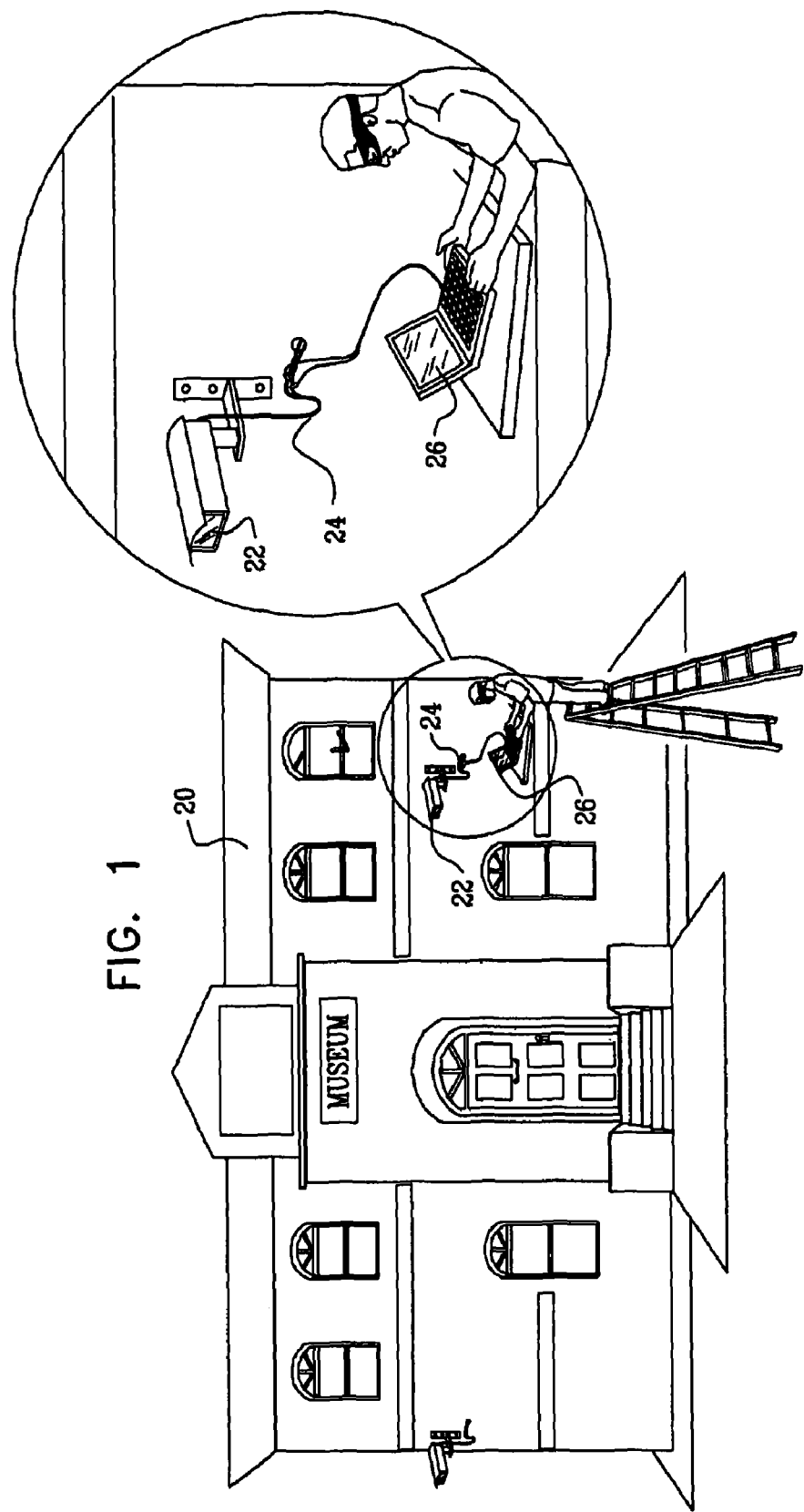
FIG. 1 is a schematic, pictorial illustration of a secured facility, which is protected in accordance with an embodiment of the present invention.

FIG. 1 is a schematic, pictorial illustration of a secured facility 20, which is protected by a network camera 22 in accordance with an embodiment of the present invention. The camera is connected to a LAN inside the facility by a link 24. Camera 22 is configured to capture images of a scene outside facility 20 and to generate and output packets containing digitized video data via a built-in network interface to link 24. The network interface operates in accordance with a predetermined protocol (such as Ethernet), which is compatible with the protocol used on the LAN in facility 20. The camera may output the packets in a continuous sequence as long as the camera is powered on and enabled. Alternatively, the camera may transmit packets only intermittently, such as when motion is detected in the picture captured by the camera, or on a certain time schedule. In any case, however, the camera is typically capable of transmitting video packets autonomously, without requiring a specific prompt or request from the LAN. Alternatively, a special-purpose circuit may be connected to the camera to prompt the camera to transmit packets on a desired schedule.

Camera 22 is mounted outside facility 20, as shown in FIG. 1, and is therefore relatively accessible to malicious parties. Thus, for example, a hacker may attempt to connect a computer 26 to link 24 in order to gain access to the LAN and to other computing and storage resources on the LAN. If successful, the hacker might be able to extract sensitive information, or reprogram computers within the facility, or tamper with or destroy stored surveillance data.

In the present embodiment, however, link 24 is a one-way link, which conveys packets containing video data from camera 22 to the LAN in facility 20, but is physically incapable of supporting outward communication from the facility. Link 24 may comprise a unidirectional fiberoptic link, for example, as in the Waterfall device mentioned above. Alternatively, link 24 may comprise any other suitable sort of one-way link, such as the types of links that are described in PCT Patent Application PCT/IL2006/001499, filed Dec. 28, 2006, which is assigned to the assignee of the present patent application and whose disclosure is incorporated herein by reference.

As a result of using the one-way link, computer 26 will not receive any return messages or data from within facility 20. Consequently, the hacker will not be able to gain access to data that are stored in the facility, and the hacker's ability to access and reprogram computers in the facility will be very limited in the absence of any sort of feedback.

Although the present embodiment relates to the use of one-way links in protecting connection points of network cameras, the principles of the present invention may similarly be applied to other sorts of network sensors. A "network sensor" in this case means a self-contained sensing device that senses a characteristic of an environment and outputs a sequence of data packets containing digitized sensor data. In the case of the network camera, the characteristic of the environment is an image of a scene in the environment. Other than cameras, a network sensor may comprise any suitable type of sensor, such as an audio sensor, an infrared or ultrasonic motion sensor, a smoke detector or a pressure sensor.

Figure 2:
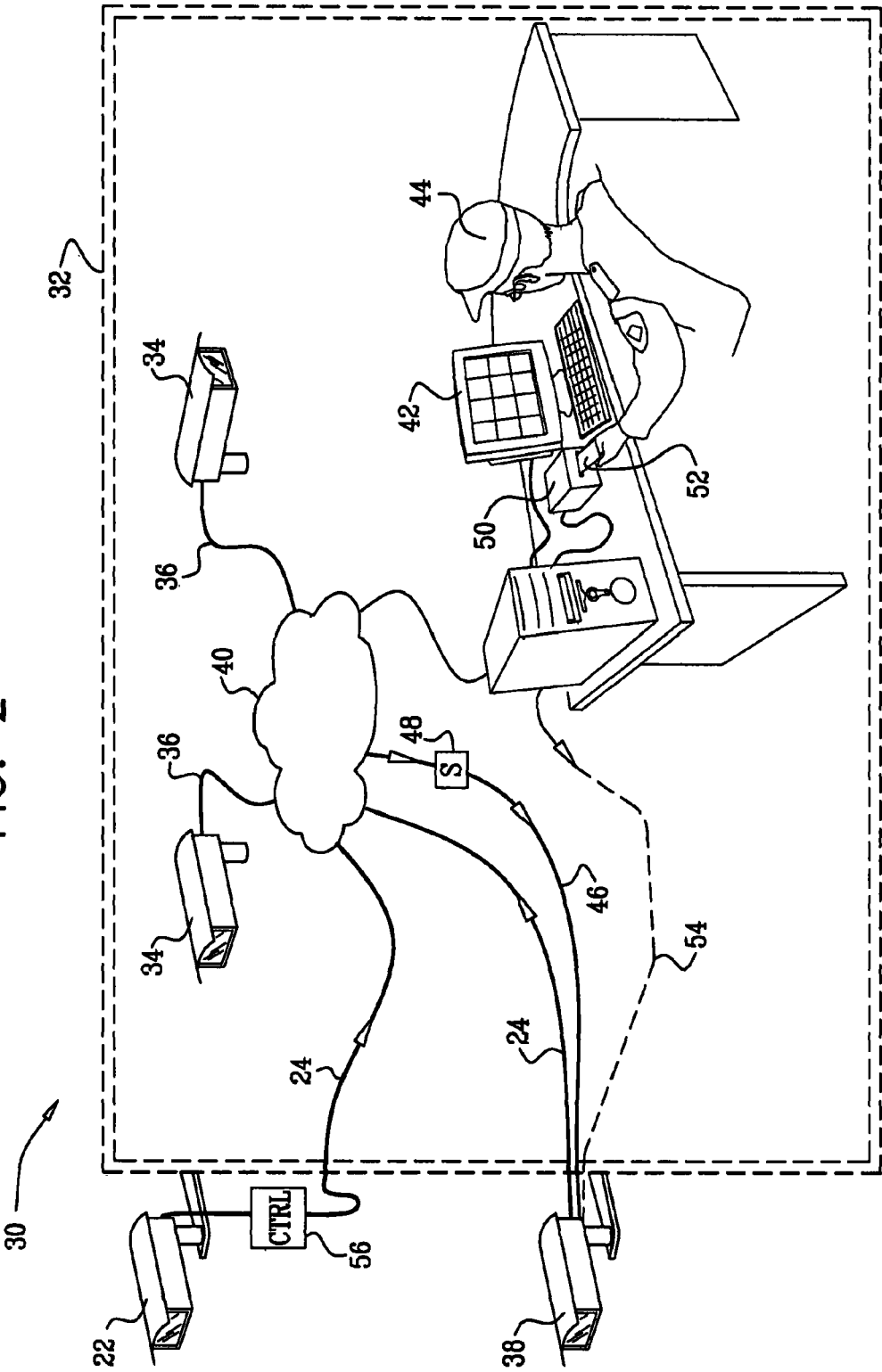
FIG. 2 is schematic, pictorial illustration of a network-based security system, in accordance with an embodiment of the present invention.

FIG. 2 is schematic, pictorial illustration of a network-based security system 30, in accordance with an embodiment of the present invention. It will be assumed, for the sake of simplicity, that system 30 is installed in facility 20, with a perimeter 32 corresponding to the outer limit of the facility (such as the walls of the building shown in FIG. 1). Thus, camera 22 is deployed outside perimeter 32 and is connected by one-way link 24 to a LAN 40 inside the facility. Other network cameras 34 are deployed within perimeter 32 and are connected to LAN 40 by respective links 36. Depending on security requirements, links 36 inside perimeter 32 may also be one-way links. The use of one-way links inside the facility can be important particularly in preventing tampering with network cameras in hidden and less-trafficked locations. A console 42 receives the packets transmitted by the cameras over the LAN and displays the video images for monitoring by an operator 44, for example.

In some cases, it may be desirable to control one or more of the cameras in system 30 so as to cause the camera to change its image capture parameters. For example, operator 44 may wish to pan, tilt or zoom a camera in order to get a better view of a point of interest, or may wish to toggle the operational mode of a camera, such as switching between day and night modes, or to request that the camera provide log or status information. Alternatively or additionally, console 42 may automatically change certain image capture parameters based on scene conditions or pre-programmed rules. Such changes may be invoked from console 42 by sending suitable commands to cameras 34, for example, via LAN 40 and links 36. Camera 22, however, cannot be controlled in this manner, since there is no outgoing link from LAN 40 to the camera.

Alternatively, a second, outgoing one-way link may be used to control network cameras that are deployed outside perimeter 32, as well as any other cameras that are vulnerable to tampering. For example, as shown in FIG. 2, a network camera 38 is connected to transmit video data packets to LAN 40 via one-way link 24, while another one-way link 46 carries outgoing commands to the camera. A switch 48 on outgoing link 46 limits the availability of the outgoing link and may prevent the simultaneous use of link 46 with link 24. Therefore, even if a hacker is successful in connecting to both of links 24 and 46 at camera 38, he still will not have the necessary interactive access for extracting data or reprogramming computers via LAN 40.

Switch 48 may be actuated in a number of possible ways, in response to certain predetermined conditions:

The switch may mechanically or electrically cut off link 46, so that no outgoing signals may be transmitted. For example, operator 44 may manually turn the switch on when he wishes to send an outgoing command to camera 38. The switch may shut off automatically thereafter. Alternatively or additionally, the switch may be actuated by a suitable message from console 42.

The switch may operate on a timer (which cannot be controlled via LAN 40), so that outgoing commands may be sent over link 46 only at certain specific times of day.

The switch may contain or be linked to a validation circuit, which checks outgoing messages for validity before transmitting them to camera 38. For example, the validation circuit may check the outgoing messages for a known digital signature. For added security, the digital signature may be stored on a smart card 52 or other medium, which the operator must insert into a suitable reader 50, as shown in FIG. 2. Alternatively or additionally, the switch may use other methods of validation, such as biometric authentication of the operator.

The switch may also check the content and structure of outgoing messages, and discard messages that are not proper camera control commands.

The above list is not meant to be exhaustive, and other methods of validation may also be used, in addition to or instead of the steps listed above. Optionally, link 24 may also be switched, so that the incoming link is inactive whenever the outgoing link is active.

Although one-way links 24 and 46 are shown in FIG. 2 as each serving a single camera, a given link may alternatively be multiplexed among a number of cameras.

Other alternative configurations may also be used to control the operation of cameras that output data via one-way links. For example, as shown in FIG. 2, a one-way link 54 may be connected directly from a standalone computer 55 or other controller to camera 38 (or to multiple cameras), rather than via network 40. One-way link 54 may be switched for enhanced security in the manner described above.

As another example, a dedicated, automatic controller 56 may be coupled between a camera, such as camera 22 in FIG. 2, and the one-way link 24 that transmits data from the camera. Controller 56 may be set to submit certain instructions (commands and/or queries) to camera 22 on a predetermined schedule, such as a request to the camera to capture and transmit an image every 5 sec, or a request to transmit a status report every 5 min, or a command to pan over a certain angular range. The controller then passes the response from the camera to network 40 over link 24 and thus obviates the need for a return link to the camera.

FIG. 3 is a flow chart that schematically illustrates a method for operating switch 48 in order to control transmission of messages to camera 38, in accordance with an embodiment of the present invention. For the purposes of this method, switch 48 is assumed to comprise or to be linked to a suitable processor (not shown) for performing the validation functions that are described above. The method as shown in FIG. 3 assumes a high level of security, in which a number of different validation steps are layered in order to ensure that only valid commands are allowed to be carried over link 46. Alternatively, only a subset of these layers may actually be used.

The method of FIG. 3 is initiated when switch 48 receives a camera control message from LAN 40, at a message input step 60. Switch 48 checks the current time against a predetermined transmission timetable, at a time checking step 62. The switch will pass the message only if transmission is permitted at this time. Otherwise, the switch discards the message, at a discard step 64. Typically, when a message is discarded for any reason, the switch sends an alert to operator 44 as an indication of a possible unauthorized attempt to transmit data over link 46.

Switch 48 checks the electronic signature of the message, at a signature validation step 66. If the signature does not match a preconfigured, authorized value, the message is discarded at step 64. The switch may also check whether the message is well-formed, at a form checking step 68. For example, the switch may check the structure and data values in the message to ensure that the message has the form of a proper command to camera 38. Again, ill-formed messages are discarded at step 64.

Assuming the message passed the tests of steps 62, 66 and 68, switch 48 may optionally shut off downlink communications over link 24, at a link shutoff step 70. Switch 48 then transmits the message over link 46 to camera 38. Once the message has been sent, switch 48 opens, preventing further outgoing transmission, and incoming transmission of video data packets resumes. Alternatively, switch 48 may be configured to allow simultaneous communication over both of links 24 and 48, at least during certain limited time periods.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Sensing apparatus, comprising:
    a network camera, which is configured to capture images of a scene and to output a sequence of data packets containing digitized video data responsively to the images; and
    a one-way link, physically configured to carry signals in one direction and to be incapable of carrying signals in the opposite direction, which is coupled to the network camera so as to transmit the data packets from the network camera to a packet communication network.

2. The apparatus according to claim 1, wherein the network camera is deployed outside a facility, and wherein the packet communication network is a local area network (LAN) that is deployed inside the facility.

3. The apparatus according to claim 1, wherein the one-way link comprises a first one-way link, and wherein the apparatus comprises a second one-way link coupled to convey commands to the network camera.

4. The apparatus according to claim 3, and comprising a switch, which is configured to be actuated in response to a predetermined condition for transmission of the commands to the network camera and to prevent transmission over the second one-way link when the predetermined condition is not satisfied.

5. The apparatus according to claim 4, wherein the switch is configured to permit the transmission of a message to the network camera only at one or more specified times of day.

6. The apparatus according to claim 4, wherein the switch is configured to permit the transmission of a message to the network camera only upon ascertaining that the message is valid.

7. The apparatus according to claim 4, wherein the switch is configured to permit the transmission of a message to the network camera only when the first one-way link is inactive.

8. The apparatus according to claim 1, wherein the apparatus comprises a controller, which is coupled to submit instructions to the network camera on a predetermined schedule and to receive and convey the data packets from the network camera over the one-way link to the packet communication network.

9. Sensing apparatus, comprising:
    a network camera, which is configured to sense a characteristic of an environment outside a facility and to output a sequence of data packets containing digitized video data responsively to the sensed characteristic; and
    a one-way link, physically configured to carry signals in one direction and to be incapable of carrying signals in the opposite direction, which is coupled to the network camera so as to transmit the data packets from the network camera to a packet communication network inside the facility.

10. A method for sensing, comprising:

deploying a network camera to sense a characteristic of an environment outside a facility and to output a sequence of data packets containing digitized video data responsively to the sensed characteristic; and coupling a one-way link, physically configured to carry signals in one direction mad to be incapable of carrying signals in the opposite direction, to the network camera so as to transmit the data packets from the network camera to a packet communication network inside the facility.

11. The method according to claim 10, wherein the network sensor comprises a network camera, and wherein the data packets in the sequence contain digitized video data responsive to images of a scene outside the facility that is captured by network camera.

12. The method according to claim 10, wherein the one-way link comprises a first one-way link, and wherein the method comprises conveying commands to the network camera from within the facility via a second one-way link.

13. The method according to claim 12, wherein conveying the commands comprises actuating a switch to operate the second one-way link in response to a predetermined condition for transmission of the commands, and preventing transmission over the second one-way link when the predetermined condition is not satisfied.

14. The method according to claim 13, wherein actuating the switch comprises permitting the transmission of a message to the network camera only at one or more specified times of day.

15. The method according to claim 13, wherein actuating the switch comprises permitting the transmission of a message to the network camera only upon ascertaining that the message is valid.

16. The method according to claim 13, wherein actuating the switch comprises permitting the transmission of a message to the network camera only when the first one-way link is inactive.

* * * * *